US012478813B1

(12) United States Patent
Patel

(10) Patent No.: US 12,478,813 B1
(45) Date of Patent: Nov. 25, 2025

(54) AUTOMATED KITCHEN HOOD FIRE TRAP

(71) Applicant: Kiran Kumar Patel, Claresholm (CA)

(72) Inventor: Kiran Kumar Patel, Claresholm (CA)

( * ) Notice: Subject to any disclaimer, the term of this patent is extended or adjusted under 35 U.S.C. 154(b) by 0 days.

(21) Appl. No.: 19/224,740

(22) Filed: May 31, 2025

(51) Int. Cl.
*A62C 3/00* (2006.01)
*A62C 2/04* (2006.01)
*A62C 37/40* (2006.01)

(52) U.S. Cl.
CPC ................ *A62C 3/006* (2013.01); *A62C 2/04* (2013.01); *A62C 37/40* (2013.01)

(58) Field of Classification Search
CPC ........... A62C 3/0257; A62C 2/10; A62C 2/06; A62C 3/006
See application file for complete search history.

(56) References Cited

U.S. PATENT DOCUMENTS

| | | | | | |
|---|---|---|---|---|---|
| 1,941,072 | A * | 12/1933 | Benziger | F23Q 25/00 | 431/145 |
| 3,049,389 | A * | 8/1962 | Chappellier | A62C 8/06 | 312/324 |
| 3,209,837 | A * | 10/1965 | Freedman | A62C 2/10 | 169/65 |
| 3,407,879 | A * | 10/1968 | O'Rear | A62C 3/006 | 169/30 |
| 3,807,480 | A * | 4/1974 | Smart | E05F 15/605 | 160/1 |
| 4,077,474 | A * | 3/1978 | Hattori | A62C 2/10 | 169/48 |
| 4,483,314 | A * | 11/1984 | Parker, Jr. | F24C 3/126 | 169/65 |
| 4,524,835 | A * | 6/1985 | Mingrone | A62C 3/006 | 169/65 |
| 4,580,638 | A * | 4/1986 | Jones | A62C 3/006 | 169/59 |
| 5,642,784 | A * | 7/1997 | Guay | F24C 15/2021 | 169/65 |
| 6,276,461 | B1 * | 8/2001 | Stager | A62C 3/006 | 169/65 |
| 7,607,488 | B2 * | 10/2009 | Durham | A62C 3/006 | 169/56 |
| 8,378,834 | B1 * | 2/2013 | Glaub | A62C 3/006 | 169/56 |

(Continued)

*Primary Examiner* — Joseph A Greenlund
(74) *Attorney, Agent, or Firm* — Gugliotta & Gugliotta LPA

(57) ABSTRACT

An automated fire suppression system for kitchen stovetops integrates with a vent hood positioned above a range top surface. The system includes a fireproof textile shroud stored within the vent hood that, upon activation, deploys downward to create a sealed fire suppression area encompassing the entire stovetop. Activation occurs either automatically through sensors detecting fire conditions or manually via a dedicated switch. Once deployed, the shroud's perimeter securely couples to the range top surface, effectively containing and smothering fires by eliminating oxygen. A secondary suppression mechanism incorporates a liquid dispensing system that, after a predetermined delay allowing for shroud deployment, releases fire suppression spray within the contained area. The system provides immediate, effective fire containment without requiring proximity to flames or complex decision-making during emergency situations.

15 Claims, 5 Drawing Sheets

(56) References Cited

U.S. PATENT DOCUMENTS

| | | | | |
|---|---|---|---|---|
| 8,622,146 | B2 * | 1/2014 | Klimek | A62C 2/10 169/56 |
| 2008/0245538 | A1 * | 10/2008 | Durham | A62C 3/006 169/46 |
| 2009/0139736 | A1 * | 6/2009 | Medina | A62C 2/06 169/54 |
| 2009/0272372 | A1 * | 11/2009 | Griffin | F24C 15/2057 169/65 |
| 2010/0139935 | A1 * | 6/2010 | Reynolds | A62C 3/006 169/65 |
| 2010/0252283 | A1 * | 10/2010 | Klimek | A62C 3/006 169/48 |
| 2011/0042110 | A1 * | 2/2011 | Nijenhuis | A62C 3/006 169/65 |
| 2018/0028850 | A1 * | 2/2018 | Ehlers | F24F 7/007 |
| 2018/0169452 | A1 * | 6/2018 | Nessel | A62C 99/0081 |
| 2019/0168045 | A1 * | 6/2019 | Griffin | A62C 3/006 |
| 2019/0390859 | A1 * | 12/2019 | Lambertson | F24C 15/2057 |
| 2020/0391061 | A1 * | 12/2020 | Enejehlm | B25J 19/02 |
| 2025/0186815 | A1 * | 6/2025 | Miller | A62C 2/10 |

* cited by examiner

AUTOMATED KITCHEN HOOD FIRE TRAP

CROSS-REFERENCE TO RELATED APPLICATIONS

There are no previously filed, nor currently any co-pending applications, anywhere in the world.

BACKGROUND OF THE INVENTION

1. Field of the Invention

The present invention relates generally to fire suppression systems and, more particularly, to an automated fire suppression system integrated into kitchen range hoods that deploys a fireproof textile shroud and misting system to rapidly contain and extinguish stovetop fires through oxygen deprivation and targeted suppression agents, activated either automatically by sensors or manually with a single button press.

2. Description of the Related Art

Stovetop fires represent a significant safety hazard in residential kitchens, posing immediate threats to life and property. The conventional approaches to extinguishing such fires have presented numerous challenges that remain inadequately addressed by existing technologies and methods.

Traditional fire suppression methods for kitchen fires include portable fire extinguishers, fire blankets, baking soda application, or covering the flame with a pot lid. However, these approaches suffer from several critical limitations. First, they require the user to remain in close proximity to the flames, exposing them to potential burns and injury. Second, they demand quick decision-making during high-stress situations when cognitive function is often compromised by panic. Third, these methods assume the appropriate suppression tools are readily accessible, which is frequently not the case during an actual emergency.

The nature of kitchen fires further complicates suppression efforts. Grease fires, which constitute a significant percentage of stovetop incidents, cannot be extinguished with water as the application of water causes violent flare-ups and potential spread of flaming grease. This counterintuitive aspect of grease fires leads to improper response by many individuals, exacerbating the emergency rather than resolving it.

Commercial kitchens have long employed automated hood suppression systems, but these have not been adapted effectively for residential use. Existing residential range hoods primarily focus on ventilation rather than fire suppression, leaving a critical gap in home safety infrastructure.

The proximity of kitchen fires to combustible materials including cabinetry, curtains, and other flammable items creates urgency for rapid suppression before the fire can spread beyond the stovetop. Conventional methods often require too much time to implement effectively, allowing flames to escalate beyond control during the critical initial moments.

The fire safety industry has identified a significant unmet need for a simple, automated solution that can:

- Respond rapidly to stovetop fire emergence;
- Keep users at a safe distance from flames;
- Function effectively regardless of fire type (grease, electrical, or material);

- Operate with minimal decision-making during panic situations;
- Integrate seamlessly with existing kitchen design elements; and
- Remain accessible and ready for immediate deployment.

Consequently, a need exists to address these specific deficiencies in the prior art by providing an integrated system that automatically deploys upon fire detection or simple button activation, creating a sealed oxygen-deprived environment while simultaneously applying appropriate suppression agents, all without requiring proximity to the flames or complex decision-making during the emergency event.

SUMMARY OF THE INVENTION

It is thus an object of the present invention to provide a simple, safe, and effective automated fire suppression system that can be immediately deployed from a kitchen range hood to smother stovetop fires by creating an oxygen-deprived environment while simultaneously applying suppression agents, without requiring the user to approach the flames or make complex decisions during emergency situations.

It is a feature of the present invention is the combination of a button-activated fireproof textile shroud that deploys from all four sides of a range hood to completely enclose the stovetop, creating an oxygen-deprived environment that smothers fires, together with an integrated misting system for additional fire suppression. This dual-action approach provides a simple, one-touch solution that effectively contains and extinguishes stovetop fires without requiring the user to make potentially dangerous decisions during a panic-inducing situation.

The present invention provides a significant advancement in residential kitchen fire safety technology. This system integrates with standard range hoods positioned above stovetops and provides an automated mechanism for rapidly suppressing stovetop fires through a dual-action approach. The primary innovation consists of a fireproof textile shroud that remains stored within the range hood during normal operation. Upon detection of a fire or manual activation, the system deploys this fire-resistant shroud downward from all four sides of the hood to create a sealed fire suppression area that completely encompasses the range top surface. The shroud's perimeter is designed to securely couple with the stovetop, creating an oxygen-deprived environment that effectively smothers flames by eliminating the oxygen necessary for combustion.

Complementing the physical barrier, the system incorporates a secondary suppression mechanism in the form of an integrated misting system. After allowing sufficient time for the shroud to deploy, the system activates sprinkler nozzles that disperse a fire-suppressing spray within the contained area. This spray may consist of water, specialized fire suppression chemicals, or a combination thereof.

The system is activated through multiple redundant triggers, including heat sensors, flame detectors, smoke detectors, and a manual activation button located alongside the standard range hood controls. The electrical architecture incorporates a timer relay and multiple safety mechanisms to ensure reliable operation during emergency situations.

It is an advantage of the present invention to provide a rapid fire suppression system that requires minimal human intervention, enabling safe extinguishment of stovetop fires with a single button press.

It is an advantage of the present invention to create a complete oxygen barrier around stovetop fires, effectively smothering flames by removing the essential element of combustion.

It is another advantage of the present invention to keep users at a safe distance from dangerous flames, preventing potential burns and injuries that commonly occur when manually fighting kitchen fires.

It is an advantage of the present invention to eliminate the need for complex decision-making during panic-inducing fire situations, when cognitive abilities are often compromised by stress.

It is another advantage of the present invention to provide effective suppression for all types of stovetop fires, including grease fires that cannot be safely extinguished with water.

It is an advantage of the present invention to incorporate multiple activation methods, including both automatic sensor detection and manual operation, ensuring reliable deployment regardless of circumstances.

It is another advantage of the present invention to integrate seamlessly with existing kitchen aesthetics, appearing as a conventional range hood during normal operation.

It is an advantage of the present invention to supplement oxygen deprivation with targeted misting capabilities, providing redundant suppression mechanisms for enhanced effectiveness.

It is another advantage of the present invention to protect surrounding cabinetry and kitchen structures from fire damage by rapidly containing flames before they can spread.

It is an advantage of the present invention to utilize readily available materials and manufacturing processes, ensuring cost-effective production and accessibility to consumers.

It is another advantage of the present invention to function as either an integrated feature in new range hoods or as a retrofit kit for existing installations, maximizing potential application.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. DETAILED DESCRIPTION OF THE FIGURES

Figure 1:
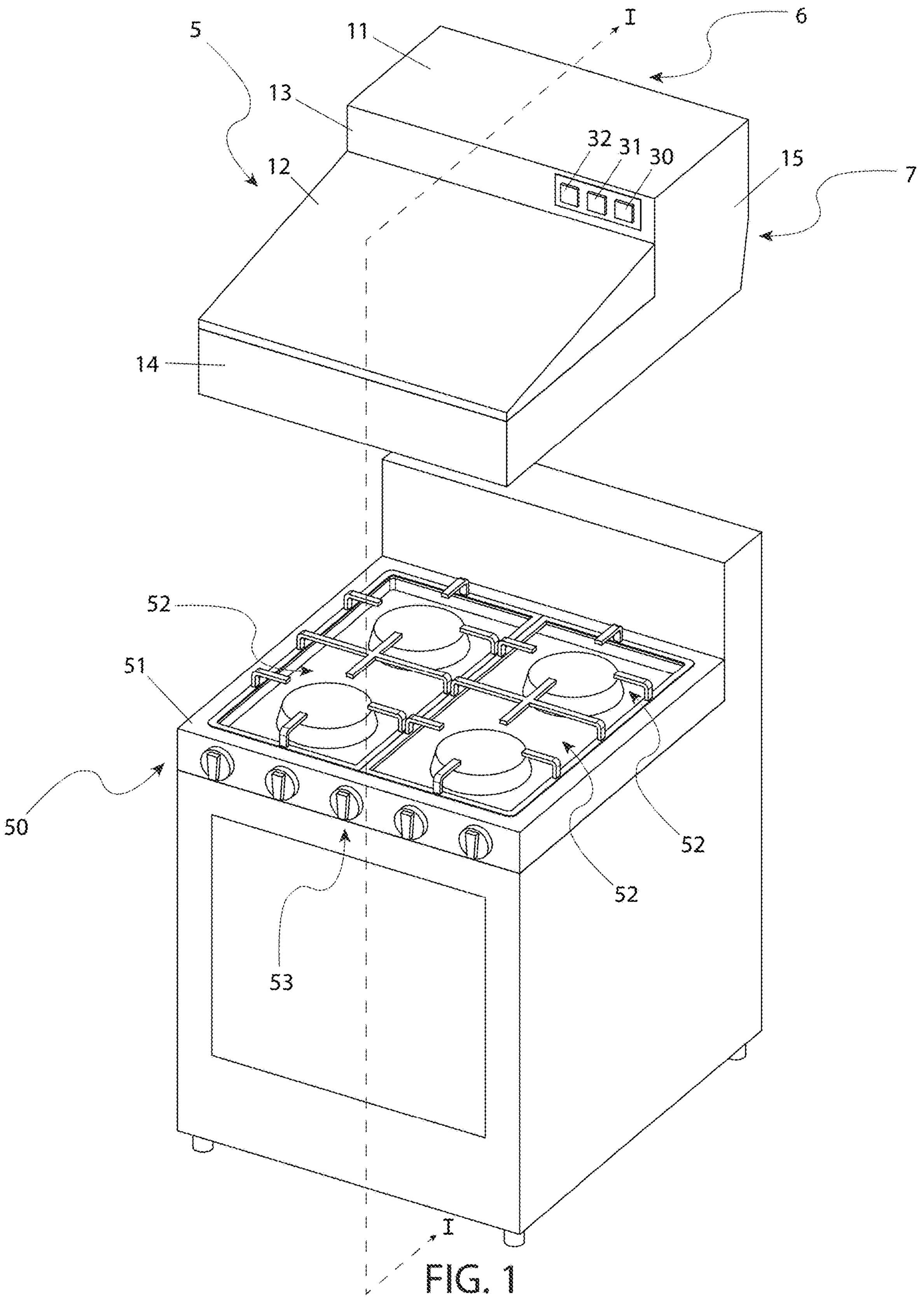
FIG. 1 is an environmental top front right view of an automated fire suppression system 5 in a non-deployed state 7 installed within a vent hood 6 over a range top 51 of an oven 50, according to a preferred embodiment of the present invention.

Referring now to the drawings, wherein like reference numerals indicate the same parts throughout the several views, an automated fire suppression system, generally noted as 5, is shown according to a preferred embodiment of the present invention. Shown in conjunction with FIG. 1, it can be seen in an environmental view that an automated fire suppression system 5 is conveniently and operably installed within a vent hood 6 of the style that is suspended over top a range top surface 51 and any burner 52 of an oven 50. The automated fire suppression system 5 is particularly suited for the rapid deployment from a non-deployed state 7, wherein a shroud 18 is retained within the vent hood 6. It is assumed that an existing vent hood 6 may be used having expected automated ventilation means and control means, such as an existing vent hood fan switch 31 that activates an existing air mover associated with the vent hood 6 and an existing vent hood light switch 32 that activates an existing illumination means associated with the vent hood 6, although it is appreciated that the automated fire suppression system 5 can be an integral feature constructed with a new vent hood 6.

The vent hood 6 is preferably installed directly over the range top surface 51 and any burners 52 that would be the source of any uncontrolled fire 60 that would need extinguished. In an exemplary embodiment, the vent hood 6 may generally have the same length and width as the range top surface 51. The vent hood 6 would further have a doubletiered or stepped section, having a bottom opening 17 that provides access to an interior, where any existing ventilation means exists. The vent hood 6 includes a pair of planar side walls 15, each having a rear edge, a bottom edge, an upper front edge, a lower front edge, a top front edge, and a rear top edge. A planar upper front wall 13 has opposing side edges affixed or otherwise attached to the upper front edges of the side walls 15, a bottom edge affixed or otherwise attached to a rear edge of the lower front edge, and a top edge. A planar lower front wall 14 has opposing side edges affixed or otherwise attached to the lower front edges of the side walls 15, a bottom edge, and a top edge. A top wall 11 has opposing side edges affixed or otherwise attached to the rear top edge of the side walls 15, a front edge affixed or otherwise attached to a top edge of the upper front wall 13, and a rear edge. A vent hood lid 12 may be removably or hingedly attached to the front top edge of the side walls 15, the top edge of the lower front wall 14, or the bottom edge of the upper front wall 13 to fully cover the top front edge of the side walls 15 and restrict access to the interior when closed and provide access thereto when open. The vent hood lid 12 may have a rearward-to-frontward slope. A rear wall 11 has opposing side edges affixed or otherwise attached to the rear edge of the side walls 15, a top edge affixed or otherwise attached to the rear edge of the top wall 11, and a bottom edge. The shroud 18 is attached within the interior of the vent hood 6 and is capable of selective deployment through the bottom opening 17 of the vent hood 6 when traveling between the non-deployed state 7 and the deployed state 9.

Figure 2:
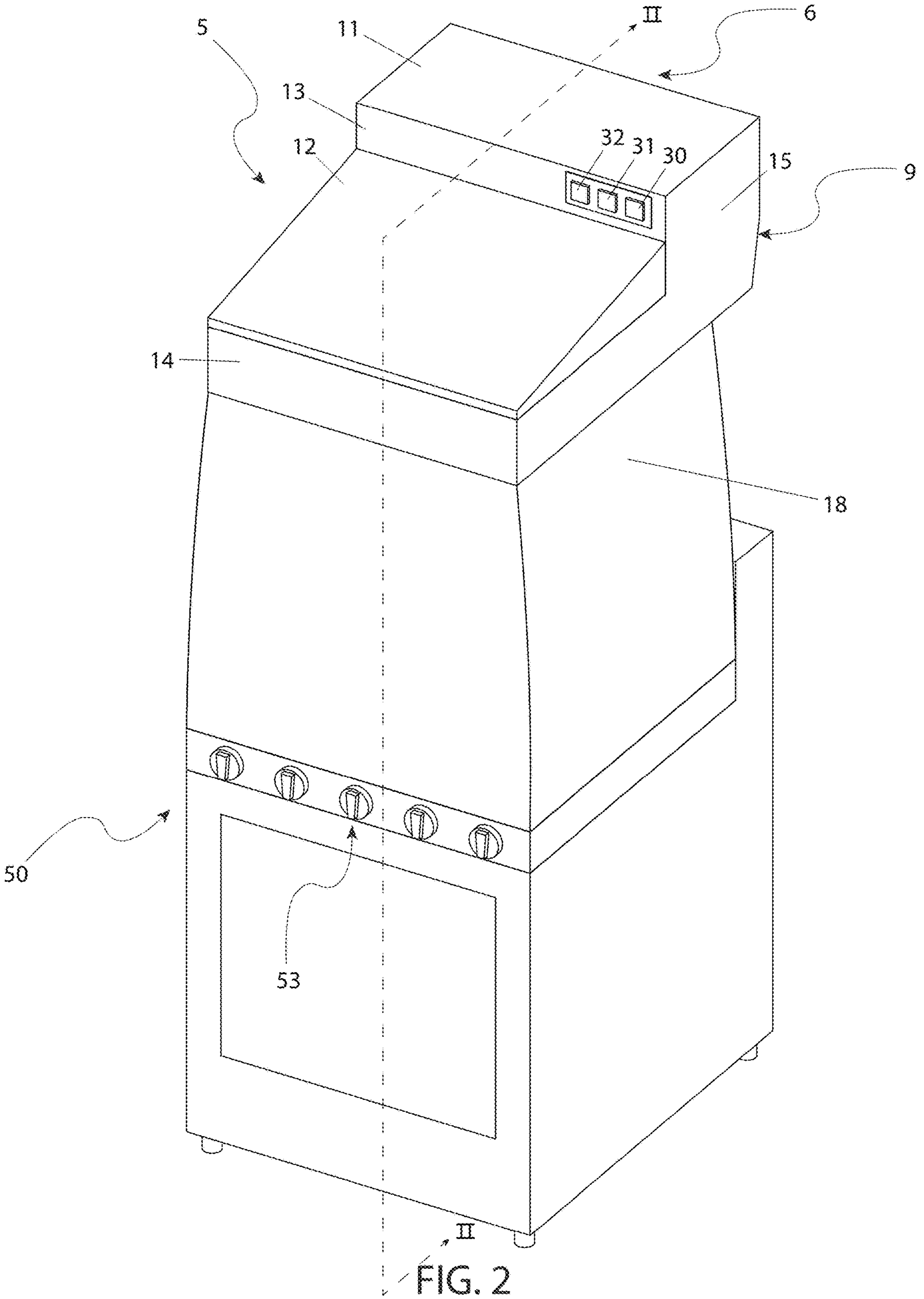
FIG. 2 is an environmental top front right view of the automated fire suppression system 5 in a deployed state 9 from the vent hood 6 to fully cover the range top 51, according to the preferred embodiment of the present invention.

Referring now to FIG. 2, it can be seen in an environmental view that the automated fire suppression system 5 is in a deployed state 9 defined as when, in the event of an uncontrolled fire 60 on the range top surface 51, the automated fire suppression system 5 receives a signal to activate a release mechanism that releases the shroud 18. The shroud 18 can then removably and securely couple to the range top surface 51, thus creating a fire suppression area 55 between the range top surface 51 and the bottom opening 17, in order to contain and snuff the uncontrolled fire 60 by limiting and eliminating the presence of oxygen. The release mechanism can be activated by a sensor 25 that senses parameters associated with an uncontrolled fire 60, or manually by a manual activation switch 30. This is especially helpful because an uncontrolled fire 60 can quickly gain in intensity and have a high potential for rapid spread. A spray 57 (not shown) of a liquid 47 may also be activated, also located within the fire suppression area 55 and directed towards the range top surface 51 and burners 52 to aid in the extinguishing effort to combat the uncontrolled fire 60. The proximity and automatic operation of the automated fire suppression system 5 within a vent hood 6 over a possible source of an uncontrolled fire 60 provides a means to quickly and safely combat the uncontrolled fire 60.

Figure 3:
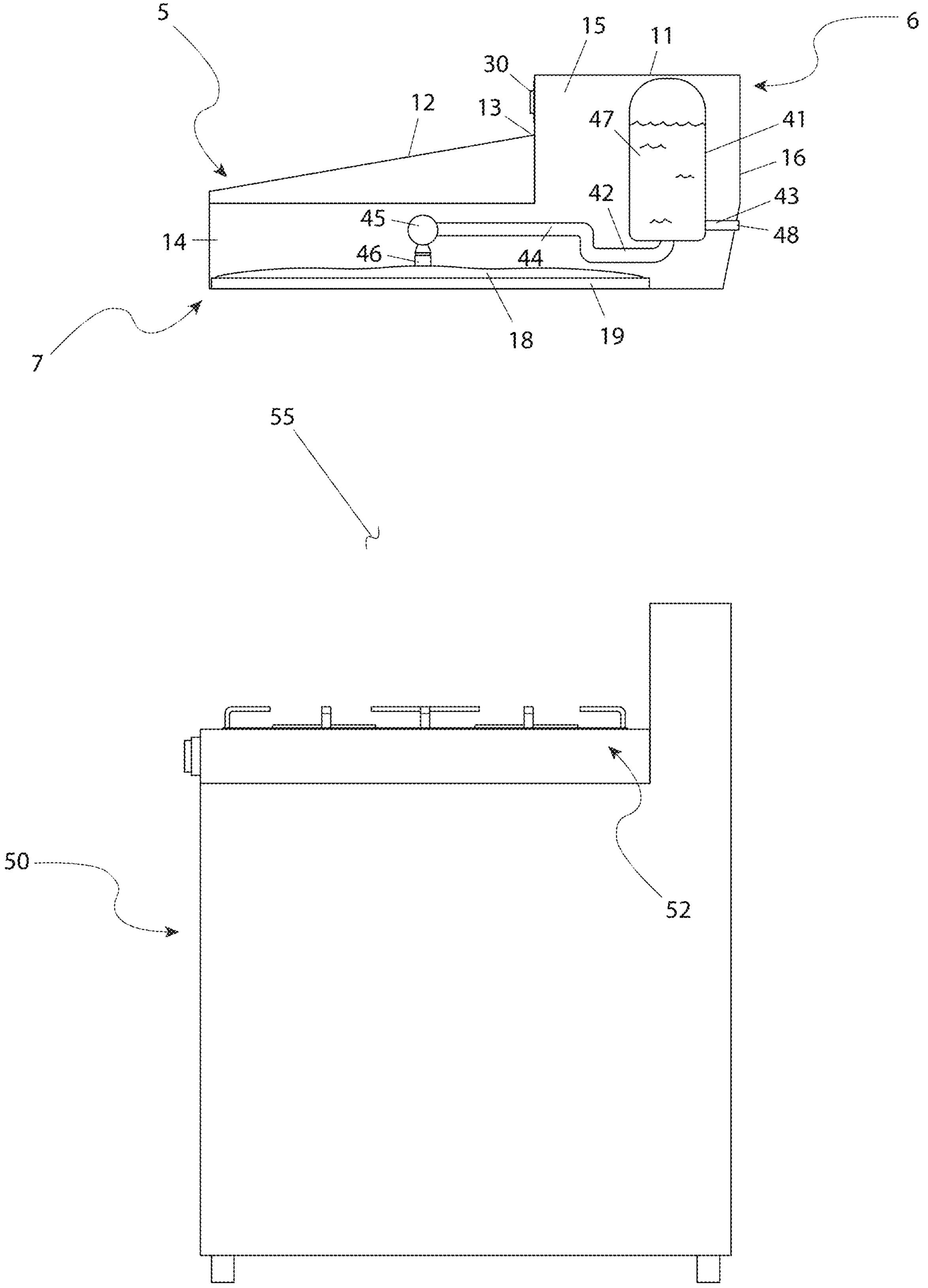
FIG. 3 is a cross-sectional view along the line I-I of FIG. 1 of the automated fire suppression system 5 in a non-deployed state 7, according to the preferred embodiment of the present invention.

Referring now to FIG. 3, it can be seen in a cross-sectional view how the automated fire suppression system 5 is installed within the vent hood 6 when in the non-deployed state 7. The shroud 18 comprises a four-sided continuous encircling material that has an upper end affixed to an interior of the vent hood 6 and a bottom end having a continuous perimeter 19. Adjacent the upper end of the shroud 18, and affixed to the vent hood 6, is at least one (1) release mechanism (not shown) that retains the shroud 18 fully within the interior of the vent hood 6 when in the non-deployed state 7. The perimeter 19 may have features enabling secure coupling to the range top surface 51. In the preferred embodiment, the perimeter 19 shall have ferromagnetic properties, along with the range top surface 52, to effect a magnetic connection therebetween. The perimeter 19 may also be weighted. The shroud 18 is constructed out of a fire-proof textile-like material capable of condensing to a small volume when stored within the vent hood 6.

A reservoir 41 is located within the vent hood 6 and is capable of being filled with a liquid 47 through an inlet line 43 with which it is in fluid communication with. A coupler 48 is in fluid communication with the inlet line 43 and is capable of providing fluid and mechanical communication with a supply for the liquid 47, such as a hose or tubing. The coupler 48 is located outside the rear wall 16. An outlet line 42 is in fluid communication between the reservoir 41 and a manifold 44. In fluid communication with the manifold 44 is at least one (1) sprinkler solenoid 45 that controls a flow of liquid from the reservoir 41 to at least one (1) nozzle 46. Each nozzle 46 is directed downward and out of the bottom opening 17 of the vent hood 6. Support features for securing any or all parts of the reservoir 41, outlet line 42, inlet line 43, manifold 44, any sprinkler solenoids 45, any nozzles 46, and any wiring or cabling within the vent hood 6 may be present.

Figure 5:
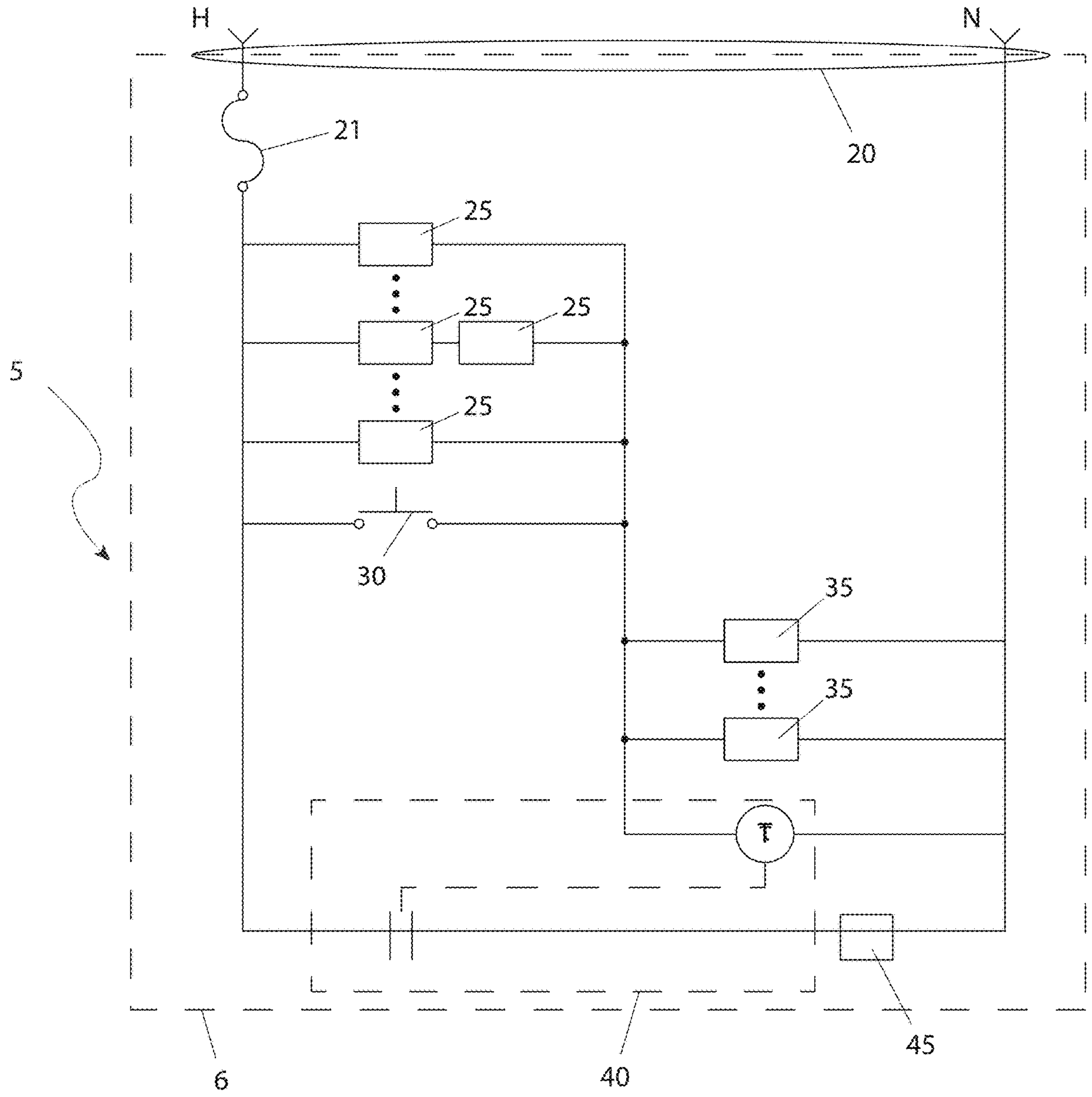

Referring now more closely to FIG. 5, an electrical schematic diagram of the automated fire suppression system 5, illustrates that electrical power for the automated fire suppression system 5 is provided by a power source 20 such as alternating current (AC) power or direct current (DC) power. The exact type of power source 20 is not intended to be a limiting factor of the present invention. Power then flows through an overcurrent protection device 21, such as a fuse (as shown) for purposes of protecting the electrical circuit. Power then flows through at least one (1) sensor 25. Each sensor 25 is envisioned to be one (1) of the following: a heat detector, a flame detector, a smoke detector, a light detector, or the like. The sensors 25 may be wired in series, such as to require more than one (1) sensor 25 to be activated to prevent inadvertent operation of the automated fire suppression system 5. The sensors 25 may also be wired in parallel as shown to ensure that the fire suppression system 5 will activate even if only one (1) sensor 25 is triggered. The quantity of sensors 25 and the type of wiring (series, parallel, or combination) is not intended to be a limiting factor of the present invention. A manual activation circuit 30 is also wired in parallel to allow for manual activation of the automated fire suppression system 10, even if none of the sensors 25 are activated.

Figure 4:
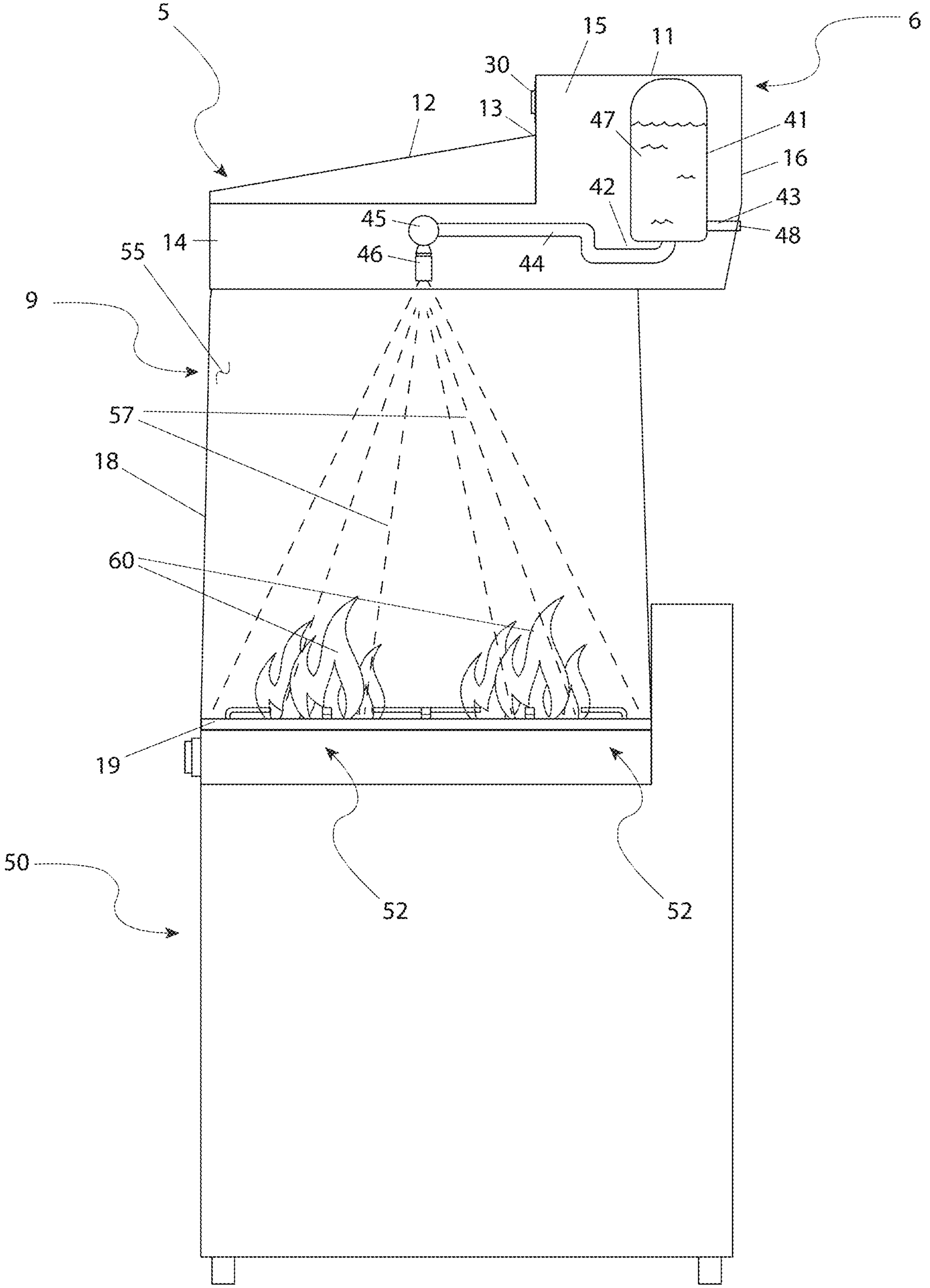
FIG. 4 is a cross-sectional view along the line II-II of FIG. 2 of the automated fire suppression system 5 in a deployed state 9 from the vent hood 6 to fully cover the range top 51, according to the preferred embodiment of the present invention; and, FIG. 5 is an electrical schematic diagram of the automated fire suppression system 5, according to a preferred embodiment of the present invention.

Referring now back to FIG. 4, it can be seen in a cross-sectional view how the automated fire suppression system 5 is depicted when in the deployed state 9 during a preferred method of use. Controlled power from the sensors 25 and the manual activation circuit 30 then flows into one (1) or more release solenoids 35 which activates any release mechanism, by which the shroud 18 is released and travels via gravity downward such that the perimeter 19 securely couples to the range top surface 51, surrounds all burners 52 and effectively creates the fire suppression area 55. The uncontrolled fire 60 is contained within the fire suppression area and is starved of oxygen and can thus be snuffed out. It is preferred that when the automated fire suppression system 5 is in the deployed state 9, the oven control panel 53 or any other control interface for the oven 50 or burners 52 are not covered and are capable of being used.

In addition, a timer relay 40 is also energized at the same time. Once an appropriate period of time has elapsed to allow the shroud 18 to fall into place and secure to the range top surface 51, the timer relay 40 then energizes at least one (1) sprinkler solenoid 45 which controls a flow of liquid 47 to any nozzle 46 for subsequent dispersal as a spray 57 to extinguish the uncontrolled fire 60. The liquid 47 may be that which already resides within the reservoir 41, or a steady flow derived from continuous access to a liquid supply from the reservoir 41 via the inlet line 43. The spray 57 may be selectively activated, either automatically or manually, to aid in suppressing the uncontrolled fire 60. The spray 57 may be water, a fire suppression chemical, or a combination thereof.

2. OPERATION OF THE PREFERRED EMBODIMENT

In operation, the automated fire suppression system 5 remains in a non-deployed state 7 during normal cooking activities, with the shroud 18 stored compactly within the vent hood 6. When an uncontrolled fire 60 occurs on the range top surface 51, the system can be activated in one of two ways. First, one or more sensors 25 may automatically detect the fire conditions-such as excessive heat, visible flames, or smoke—and trigger the system. Alternatively, a user may manually activate the system by pressing the manual activation switch 30 located alongside the standard range hood controls. Once activated, power flows to the release solenoid 35, which immediately releases the shroud 18. The shroud then deploys downward via gravity, with its perimeter 19 securely coupling to the range top surface 51 through magnetic attraction or by weighted design. This creates a sealed fire suppression area 55 that contains the fire and deprives it of oxygen, effectively smothering the flames. Simultaneously, the timer relay 40 is energized and, after a brief predetermined delay to allow complete deployment of the shroud 18, activates the sprinkler solenoid 45. This releases the liquid 47 from the reservoir 41 through the nozzle 46, creating a spray 57 within the fire suppression area 55 for additional fire extinguishing capability. The system effectively combines physical containment with active suppression, requiring no further human intervention once activated, and allows the fire to be extinguished safely while maintaining access to the oven controls 53 for deactivating the heat source.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. An automated fire suppression system for a cooking range comprising:

a vent hood positioned above a range top surface;

a fireproof textile shroud having an upper end affixed to an interior of said vent hood and a bottom end having a weighted continuous perimeter comprising ferromagnetic properties;

at least one release mechanism that retains said shroud within said interior of said vent hood in a non-deployed state;

at least one activation circuit for triggering said release mechanism to deploy said shroud to a deployed state wherein said perimeter securely couples to said range top surface through magnetic attraction, creating a sealed oxygent-deprived fire suppression area between said range top surface and said vent hood that completely encompasses the stovetop; and a liquid dispensing system comprising a reservoir, at least one nozzle directed toward said range top surface, and at least one valve for controlling flow of liquid from said reservoir to said at least one nozzle wherein the liquid dispensing system is activated after shroud deployment via a timer relay.

2. The automated fire suppression system of claim 1, wherein said at least one activation means comprises at least one sensor selected from the group consisting of a heat detector, a flame detector, a smoke detector, and a light detector wired in parallel to ensure activation if any single sensor detects fire conditions.

3. The automated fire suppression system of claim 1, wherein said at least one activation means comprises a manual activation switch positioned alongside standard range hood controls for single-button emergency activation.

4. The automated fire suppression system of claim 1, wherein said liquid dispensing system further comprises a timer relay configured to activate said liquid dispensing system after a predetermined time period following deployment of said shroud without any door closing or opening functionality, wherein said timer relay operates independently of any closure device movement and is dedicated solely to coordinating fire suppression timing between shroud deployment and liquid release.

5. The automated fire suppression system of claim 1, wherein said perimeter of said shroud comprises ferromagnetic properties embedded within a weighted textile border to effect a magnetic connection with said range top surface ensuring complete perimeter sealing.

6. The automated fire suppression system of claim 1, wherein said perimeter of said shroud is weighted to maintain secure coupling with said range top surface and comprises a continuous metallic strip providing both magnetic attraction and gravitational deployment assistance.

7. The automated fire suppression system of claim 1, wherein said liquid dispensing system further comprises:

an inlet line in fluid communication with said reservoir;

a coupler in fluid communication with said inlet line for connecting to an external liquid supply;

an outlet line in fluid communication between said reservoir and a manifold; and at least one sprinkler solenoid in fluid communication with said manifold that controls flow of liquid to said at least one nozzle, wherein activation is coordinated with shroud deployment through timer relay control.

8. The automated fire suppression system of claim 1, wherein said liquid comprises water, a fire suppression chemical, or a combination thereof dispensed after a predetermined delay following shroud deployment to prevent interference with the oxygen deprivation mechanism.

9. The automated fire suppression system of claim 1, wherein said at least one activation means comprises multiple sensors wired in parallel to ensure activation if any single sensor detects conditions indicative of a fire and includes manual override capability for immediate emergency deployment.

10. The automated fire suppression system of claim 1, wherein said shroud is configured to deploy such that an oven control panel remains accessible when said shroud is in said deployed state while completely enclosing the cooking surface area to create an oxygen-deprived environment.

11. A method for suppressing fires on a cooking range comprising:

detecting conditions indicative of a fire on a range top;

deploying a fireproof textile shroud from a vent hood positioned above said range top surface surface via gravity-assisted release mechanism;

creating a sealed fire suppression area by securely coupling a ferromagnetic weighted perimeter of said shroud to said range top surface through magnetic attraction;

depriving a fire of oxygen within said fire suppression area by complete enclosure of the cooking surface; and dispensing a fire suppressing liquid through at least one nozzle into said fire suppression area after a predetermined time delay following deployment of said shroud to ensure shroud sealing is complete before liquid application.

12. A kit for retrofitting an existing kitchen vent hood with an automated fire suppression system comprising:

a fireproof textile shroud configured to be installed within said vent hood having a weighted perimeter with embedded ferromagnetic properties;

at least one release mechanism configured to retain said shroud in a non-deployed state and release said shroud upon activation via gravity deployment;

at least one sensor configured to detect conditions indicative of a fire;

a manual activation switch; a control circuit configured to trigger said release mechanism upon receiving signals from said at least one sensor or said manual activation switch; a reservoir configured to hold a fire suppression liquid; at least one nozzle configured to dispense said liquid toward a range top surface; and installation hardware for mounting said components within said existing vent hood including magnetic coupling elements for secure shroud attachment.

13. The automated fire suppression system of claim 1, wherein said shroud comprises a four-sided continuous encircling material capable of condensing to a small volume when stored within said vent hood and deploying to create a complete oxygen barrier around the entire cooking surface.

14. The automated fire suppression system of claim 1, further comprising an overcurrent protection device positioned between a power source and said at least one activation means and a timer relay system coordinating shroud deployment with delayed liquid dispenser activation.

15. The automated fire suppression system of claim 1, wherein said vent hood includes existing ventilation means and control means that remain operational alongside said automated fire suppression system without interference from the deployed shroud or liquid dispensing operations.

* * * * *